Patented Nov. 4, 1924.

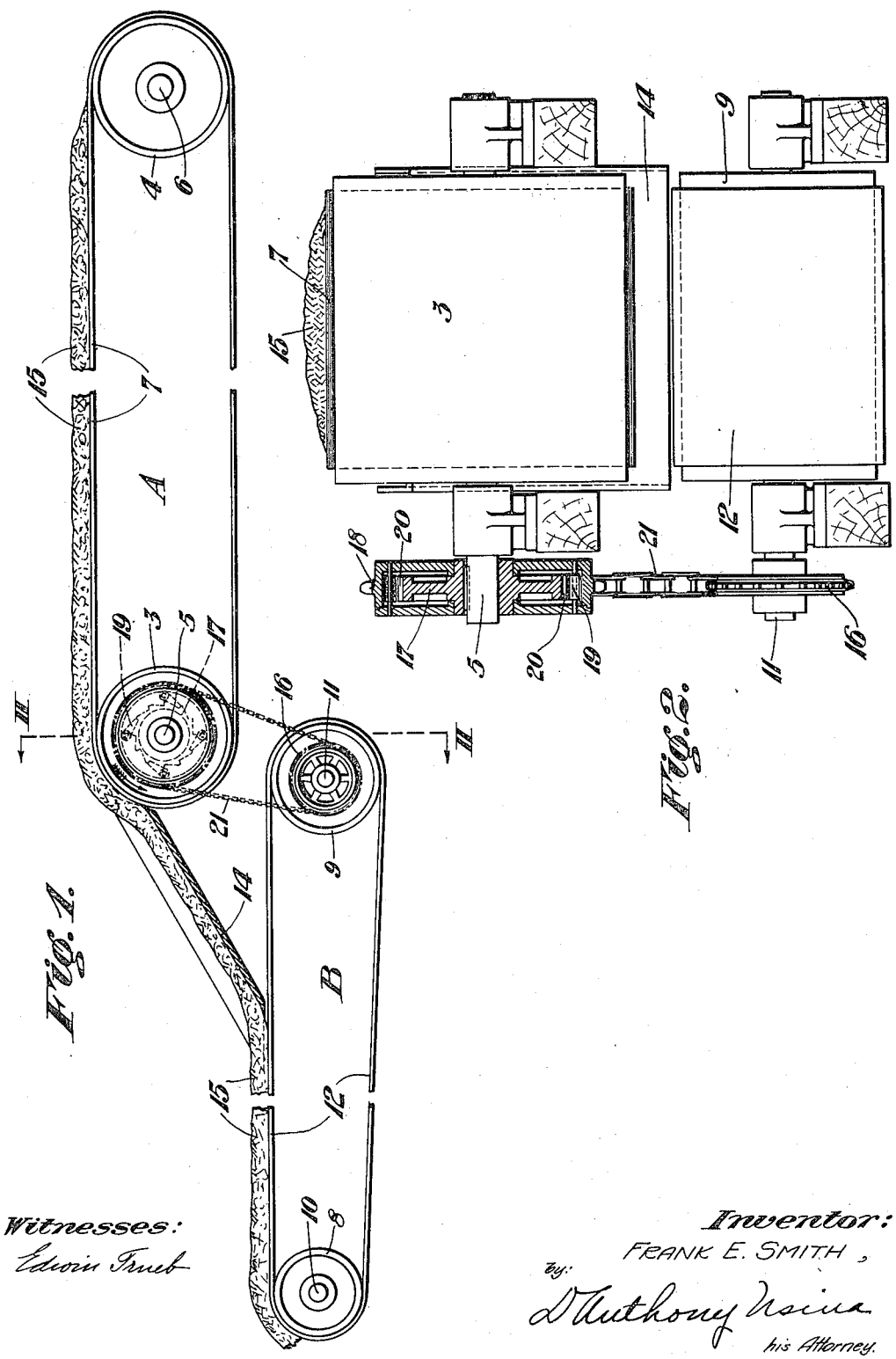

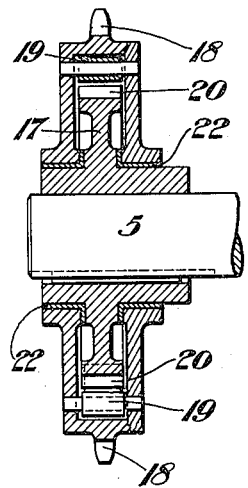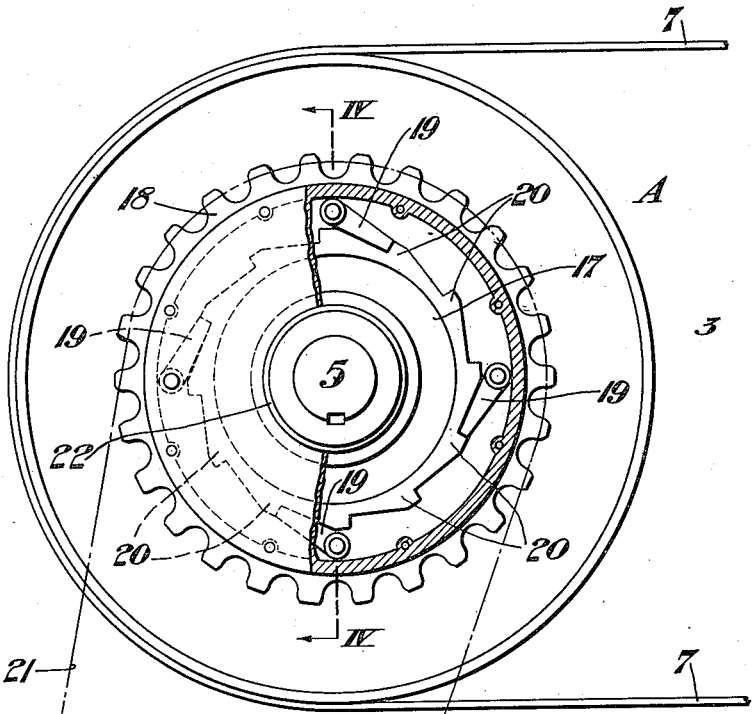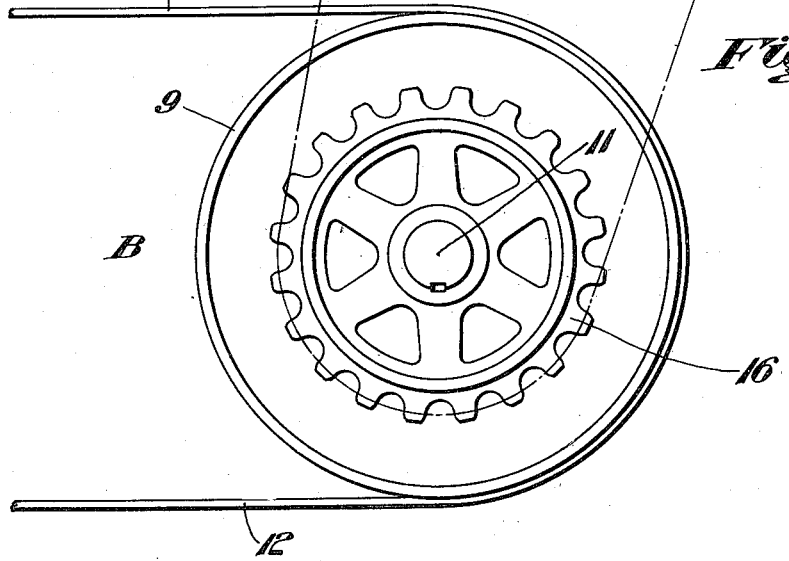

1,513,765

UNITED STATES PATENT OFFICE.

FRANK E. SMITH, OF SCOTTDALE, PENNSYLVANIA.

SPEED-EQUALIZING MECHANISM.

Application filed December 22, 1923. Serial No. 682,292.

*To all whom it may concern:*

Be it known that I, FRANK E. SMITH, a citizen of the United States, and resident of Scottdale, in the county of Westmoreland and State of Pennsylvania, have invented certain new and useful Improvements in Speed-Equalizing Mechanisms, of which the following is a specification.

This invention relates to conveyer systems, and while not limited thereto, relates more particularly to systems of belt conveyers including feeding and receiving conveyers, and has for its object the provision of automatic means for equalizing the speed of travel of two or more co-operating conveyers.

Another object is to provide a mechanical interlocking mechanism for equalizing the speed of co-operating conveyers.

A further object is to provide a conveyer system with the novel form of automatic, mechanical interlocking mechanism, adapted to substantially equalize the speed of two conveyer units, such as described in the following specification and illustrated in the accompanying drawings.

In the drawings, Figure 1 is a partial side elevation of two belt conveyers having my invention applied thereto.

Figure 2 is an enlarged transverse sectional elevation on the line II—II of Figure 1.

Figure 3 is an enlarged side elevation of the abutting ends of the conveyers, partly in section.

Figure 4 is a detail section taken on the line IV—IV of Figure 3.

Referring more particularly to the drawings, the letter A designates the feeding conveyer adapted to deliver material through chute 14 onto the receiving conveyer B.

The conveyer A comprises head and tail pulleys 3 and 4 mounted on shafts 5 and 6, respectively, and a belt conveying member 7 trained over the pulleys 3 and 4.

The conveyer B is located on a slightly lower plane and comprises head and tail pulleys 8 and 9 mounted on shafts 10 and 11, respectively, and a belt conveying member 12. The chute 14 is arranged to guide the material being conveyed, designated at 15, from the conveyer A onto the conveyer B.

In the use of conveyers such as described, there are many conditions which operate to cause the receiving conveyer to move at a lesser speed than the feeding conveyer, and therefore cause overloading of the receiving conveyer. The present invention overcomes the difficulty entirely by the use of a novel mechanical interlocking of the conveyers.

The mechanical interlock comprises a sprocket 16 keyed on the tail shaft 11 of the conveyer B, a ratchet wheel 17 keyed on the head shaft 5 of the conveyer A, a sprocket 18 mounted to rotate freely around the ratchet 17 and having a plurality of pawls 19 pivotally connected thereto adapted to be engaged by the teeth 20 of the ratchet wheel, and a drive chain 21 trained over said sprockets. A suitable bearing bushing 22 is mounted between the sprocket 18 and ratchet 17 to prevent undue wearing of the parts.

Assuming that the conveyers A and B are normally driven at the same speed, suitable sprockets are selected so that when equal speed is maintained the chain 21 will drive the sprocket 18 a little faster than the ratchet wheel 17, thereby preventing the engagement of the pawls 19 with the teeth 20 of the ratchet. However, should the conveyer B slow down for any reason the sprocket 16 will slow down and hence the sprocket 18 will be slowed down and the ratchet wheel teeth 20 will engage the pawls 19 on the sprocket 18 and cause a conveyer B to speed up to the same speed as the conveyer A.

It will thus be seen that should the conveyer A speed up or the conveyer B slow down so as to establish a differential of travel speed between the conveyers the equalizing or interlocking mechanism will act to substantially equalize the speed of both conveyers.

While I have illustrated and described only one specific embodiment of my invention, it will be understood that I do not wish to be limited thereto, since various modifications may be made without departing from the scope of my invention as defined in the appended claims.

I claim:—

1. In a belt conveyer system having independently driven feeding and receiving conveyers, each of said conveyers being provided with a head shaft and a tail shaft, mechanical means for interlocking said conveyers to prevent the feeding conveyer from traveling faster than the receiving conveyer, said means comprising a sprocket secured to the tail shaft of said receiving conveyer, a second sprocket loosely mounted for normal free rotation on the head shaft of said feeding conveyer, a drive chain connecting said sprockets, and means for automatically forming a driving connection between the head shaft of said feeding conveyer and said second named sprocket when said feeding conveyer travels at a greater speed than said receiving conveyer.

2. In a belt conveyer system having independently driven feeding and receiving conveyers, each of said conveyers being provided with a head shaft and a tail shaft, mechanical means for interlocking said conveyers to prevent the feeding conveyer from traveling faster than the receiving conveyer, said means comprising a sprocket secured to the tail shaft of said receiving conveyer, a second sprocket loosely mounted for normal free rotation on the head shaft of said feeding conveyer, a drive chain connecting said sprockets, and a pawl and ratchet mechanism for automatically forming a driving connection between the head shaft of said feeding conveyer and said second named sprocket when said feeding conveyer travels at a greater speed than said receiving conveyer.

In testimony whereof, I have hereunto set my hand.

FRANK E. SMITH.